Patented Feb. 4, 1930

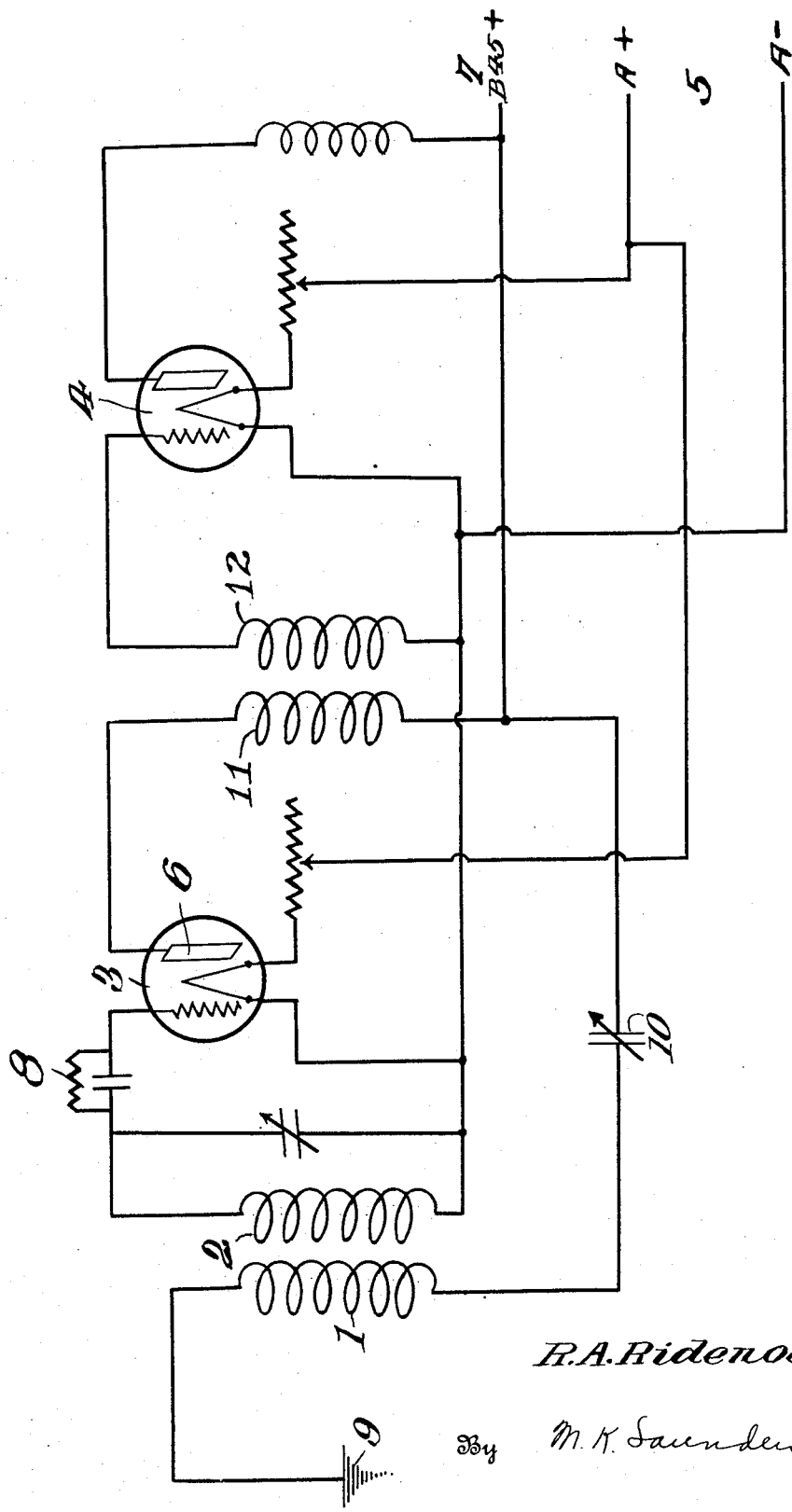

1,745,715

UNITED STATES PATENT OFFICE

RANDOLPH A. RIDENOUR, OF HAMILTON, OHIO

RADIO RECEIVING APPARATUS

Application filed February 26, 1927. Serial No. 171,188.

This invention relates to radio receiving apparatus and the object of my invention is to provide means hereby an antenna may be dispensed with thereby eliminating the disturbances transmitted through space.

Another object of my invention is to provide a method and means for grounding the input coil of a radio receiving apparatus in which the antenna or substitute therefor has been eliminated, and for completing the circuit through the coil.

I obtain the above and other objects of the invention which will be apparent as the description proceeds by means of the apparatus shown in the accompanying drawing, which is a conventional showing of a portion of a neutrodyne circuit with my invention incorporated therein.

In the drawings, in which like reference characters indicate like parts on the figure thereof,—

1 indicates the primary winding of the input transformer of a radio receiving apparatus, this winding preferably consisting of seven turns. 2 indicates the secondary winding of the transformer, preferably of sixty-seven turns. The primary winding is directly over the secondary winding and in order that the selectivity of the apparatus may be increased, the primary winding is disposed closely around the lower portion only of the secondary coil.

3, 4, indicate the usual three electrode vacuum tubes, 3 constituting a detector, and 4 an amplifier, the filament cathodes of which are in circuit with the "A" battery 5, while the plates 6 are in circuit with the "B" battery 7. A variable grid leak and condenser 8 is inserted in the detector circuit, as is shown in my prior Patent No. 1,593,361.

All of the foregoing apparatus is common to that of a conventional detector circuit. In my improved receiving apparatus, the antenna is dispensed with, the primary winding being led out at the top of the transformer and grounded as at 9.

The primary coil is thus placed in the circuit with the plates of the tubes. In this circuit, with the primary coil, the plates and the "B" battery, is located a condenser 10, which may vary from .00025 to 1 microfarad, depending upon the circuit in which it is located.

The elimination of the antenna eliminates the disturbances ordinarily received over such antenna, the wireless signals transmitted through the ground being the only ones received by my improved apparatus. In addition, the location of the primary winding of the transformer in the plate circuit greatly improves the selectivity of the apparatus.

In order to permit of amplification as desired of a detected signal, there is provided a second inductance comprising windings 11 and 12, this inductance forming a coupling means between the output of the detector stage and the input of the amplifier.

It will be seen that there is provided by this invention a detector having input and output circuits and coupling means comprising primary and secondary windings, the input circuit including the secondary winding and the output circuit having a coupling means to an amplifier stage including an inductance which inductance is connected in series with the primary winding aforementioned and with a variable capacity such as the variable condenser 10 and furthermore that the circuit in which these members are connected in series, is grounded. This invention then will function as a pick up means when properly placed in a radio receiving system, for such broadcasting signals as are transmitted through the earth and will function as an eliminator for the conventional type of antenna which is located above the ground. It is well known that signals picked up from the ground are remarkably free of interference such as static and artificial strays which would otherwise be received with signals through the ether.

It is to be understood that the transformer and the primary and secondary windings thereof will vary according to the type of radio receiving apparatus with which they are to be used, and that while a variable condenser 10 is shown and described, this is merely for the purpose of adjusting the condenser to the circuit and to the conditions under which the apparatus is to be used, after which the condenser remains fixed for the apparatus.

It is apparent that my invention is adapted for use in connection with any suitable radio receiving apparatus, such as a regenerative apparatus, to which it may be attached by substituting it for the receiving coil and connecting the primary winding as shown.

Having thus described my invention what I claim as new, and desire to secure by Letters Patent, is:—

1. In a radio receiving apparatus, having a three electrode vacuum tube and input and output circuits therefor, coupling means comprising primary and secondary windings, said input circuit including the secondary winding and said output circuit having coupling means including an inductance, said inductance and said primary winding being connected in series with a capacity and grounded.

2. In a radio receiving apparatus, having a three electrode vacuum tube and input and output circuits therefor, coupling means comprising primary and secondary windings, said input circuit including the secondary winding and said output circuit having coupling means including an inductance, said inductance and said primary winding being connected in series with a variable capacity and grounded.

3. Pick up means for a radio receiving system comprising a three electrode vacuum tube and input and output circuits therefor, said pick up means including a plurality of inductances in the plate circuit of said tube, means for tuning said plate circuit, and means coupling one of said inductances to said input circuit, said last named inductance being grounded.

4. Pick up means for radio receiving system comprising a three electrode vacuum tube, input and output circuits therefor, said pick up means including a plurality of inductances in the plate circuit of said tube, a capacity in said plate circuit, means coupling one of said inductances to said input circuit and providing a feed back thereto, said last named inductance being grounded.

In testimony whereof I affix my signature.

RANDOLPH A. RIDENOUR.